US007252889B2

(12) United States Patent
Kao

(10) Patent No.: US 7,252,889 B2
(45) Date of Patent: Aug. 7, 2007

(54) 'GLOW-IN-THE-DARK' GAZING GLOBES AND OTHER ORNAMENTS, PARTICULARLY FOR GARDENS

(75) Inventor: Kuang Hung Kao, Taipei (TW)

(73) Assignee: Echo Valley Products, Ann Arbor, MI (US)

( * ) Notice: Subject to any disclaimer, the term of this patent is extended or adjusted under 35 U.S.C. 154(b) by 490 days.

(21) Appl. No.: 10/833,219

(22) Filed: Apr. 27, 2004

(65) Prior Publication Data

US 2005/0003120 A1 Jan. 6, 2005

Related U.S. Application Data

(60) Provisional application No. 60/466,105, filed on Apr. 28, 2003.

(51) Int. Cl.
*B32B 37/00* (2006.01)

(52) U.S. Cl. ........................ 428/542.2; 156/63; 156/67

(58) Field of Classification Search .................. 156/63, 156/67; 362/84; 428/7, 34.1, 542.2
See application file for complete search history.

(56) References Cited

U.S. PATENT DOCUMENTS 4,400,162 A * 8/1983 Rustemis .................... 434/291
4,546,417 A * 10/1985 Watts .......................... 362/84
5,811,159 A * 9/1998 Chang .......................... 428/11
2001/0043467 A1* 11/2001 Carpenter et al. ............ 362/84

FOREIGN PATENT DOCUMENTS

GB 2211885 A * 7/1989

* cited by examiner

*Primary Examiner*—Jeff H. Aftergut
(74) *Attorney, Agent, or Firm*—Gifford, Krass, Sprinkle, Anderson & Citkowski, PC

(57) ABSTRACT

A method of fabricating glow-in-the-dark gazing globes or other objects, as well as the articles that result. The method comprises the steps of providing a hollow form having an inner wall made from a transparent or translucent material, the form including an aperture for gaining access to the interior thereof, and introducing one more photoluminescence or phosphorescent pigments into the form through the aperture so that they cling to the inner wall. In alternative embodiments, the pigments may be applied without an adhesive, as by naturally cling, vacuum evaporation, or other techniques. In a gazing globe embodiment, a stand may be included. In the preferred embodiment the method further includes the step of applying an adhesive to the inner wall of the form prior to the step of introducing one more photoluminescence of phosphorescent pigments. A plurality of different pigments may be introduced into the form to create a decorative or swirling effect.

6 Claims, 1 Drawing Sheet

'GLOW-IN-THE-DARK' GAZING GLOBES AND OTHER ORNAMENTS, PARTICULARLY FOR GARDENS

REFERENCE TO RELATED APPLICATION

This application claims priority from U.S. Provisional Patent Application Ser. No. 60/466,105, filed Apr. 28, 2003, the entire content of which is incorporated herein by reference.

FIELD OF THE INVENTION

This invention relates generally to outdoor ornaments and, in particular, to gazing globes and other statuary with 'glow-in-the-dark' features.

BACKGROUND OF THE INVENTION

Garden ornaments such as gazing globes have become very popular as decorative elements in gardens and other outdoor environments. Such items are generally provided as a piece of statuary, including a spherical globe with a highly-polished or reflective surface supported by a base. Existing products typically use glass globes internally mirrored surface tinted in a wide variety of colors.

SUMMARY OF THE INVENTION

This invention resides in a method of fabricating glow-in-the-dark gazing globes or other objects, as well as the articles that result. The method comprises the steps of providing a hollow form having an inner wall made from a transparent or translucent material, the form including an aperture for gaining access to the interior thereof, and introducing one more photoluminescence or phosphorescent pigments into the form through the aperture so that they cling to the inner wall.

In alternative embodiments, the pigments may be applied without an adhesive, as by naturally cling, vacuum evaporation, or other techniques. In a gazing globe embodiment, a stand may be included. In the preferred embodiment the method further includes the step of applying an adhesive to the inner wall of the form prior to the step of introducing one more photoluminescence of phosphorescent pigments. A plurality of different pigments may be introduced into the form to create a decorative or swirling effect.

DETAILED DESCRIPTION OF THE INVENTION

This invention extends the appeal and usefulness of garden ornaments, including gazing gloves, by providing a glow-in-the-dark product. In the preferred embodiment, one or more phosphorescent or photo luminescent pigments may be used to create a swirling affect or other interesting pattern. However, in an alternative environment, a single or solid coloration is used.

Figure 1:
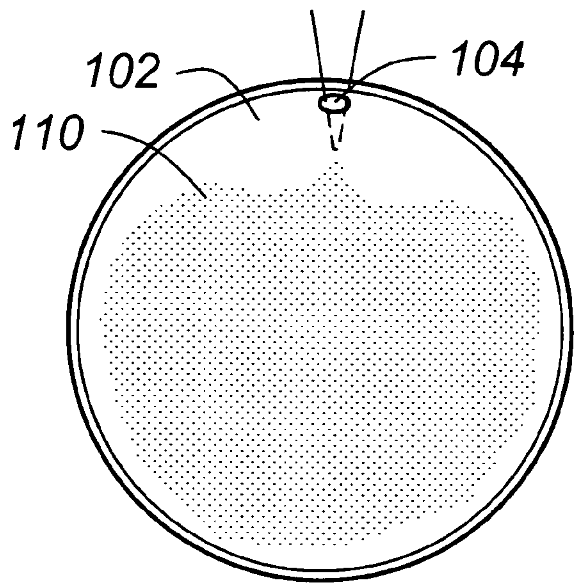
FIG. 1 is a simplified drawing showing the way in which an adhesive may be applied to the inside of a gazing globe.
Figure 2:
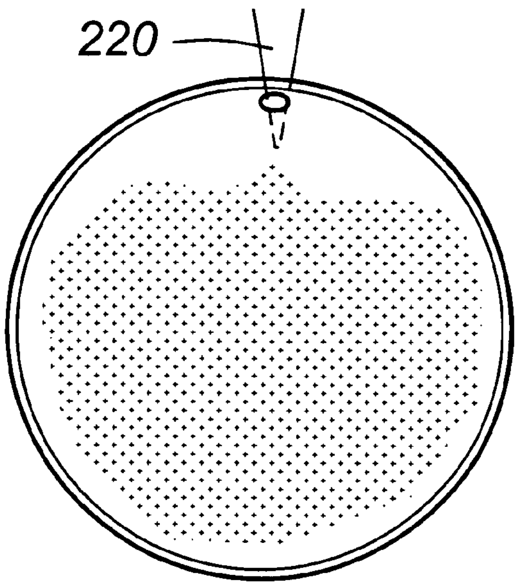
FIG. 2 is a drawing which shows the way in which a glow-in-the-dark powder may be introduced into the globe of FIG. 1.
Figure 3:
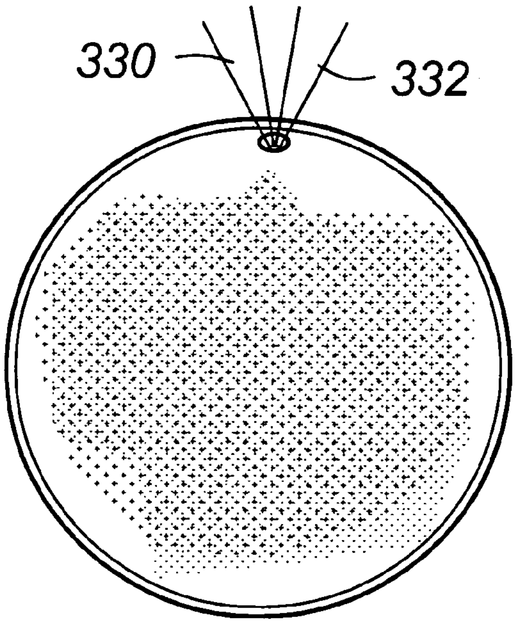
FIG. 3 is a drawing which shows the way in which multiple nozzles may be used to introduce multiple particulates.
Figure 4:
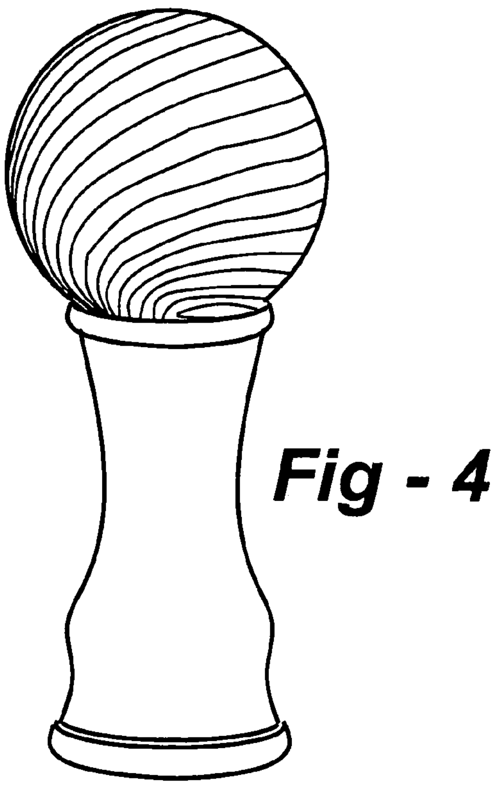
FIG. 4 is a drawing which shows a finished product on a stand.

FIG. 1 is a simplified drawing showing the way in which an adhesive may be applied to the inside of a gazing globe. FIG. 2 is a drawing which shows the way in which a glow-in-the-dark powder may be introduced into the globe of FIG. 1. FIG. 3 is a drawing which shows the way in which multiple nozzles may be used to introduce multiple particulates. FIG. 4 is a drawing which shows a finished product on a stand. In terms of manufacture, a clear or at least translucent glass or plastic globe 102 or other object having an opening 104 is first internally coated with an adhesive. The adhesive may be water-bourne or non-water-bourne, may be applied in a spray 110 or atomized form or by brushing, and preferably dries in a transparent form.

While the adhesive coating is still wet or tacky, photoluminescent or phosphorescent pigments are sprayed on with an atomizer 220 or otherwise introduced so that they become embedded in the adhesive and form an inner coating. Either a single spray head may be used, or multiple spray heads 330, 332 may be used simultaneously or at different times to produce a desired affect. It is also possible to apply the pigments without an adhesive, as by naturally cling, vacuum evaporation, or other techniques. In a gazing globe embodiment, a swirling effect may be created by introducing pigments on an angle or rotating the globe, and/or placed on a vertical stand, as shown in FIG. 4.

Various pigments are applicable to the invention, and they may be combined with other pigments that are not photoactive to create a reflection as well as glow-in-the-dark features. Applicable pigments include alkaline earth metal aluminates such as strontium aluminate, silicate aluminate, or alkaline earth aluminate, with glow colors ranging from green-yellow to purple-blue. Depending upon the mixture, "earth metals" can include strontium, magnesium, calcium, and barium. Silicon and titanium may also be present. It is typically doped with europium. An opaque fluorescent pigment may be added to provide visibility in a brighter environment. As a side effect, the fluorescent pigments also tint the glow which can produce glow colors such as orange alkaline earth silicate may also be used, which produces a very pure sky blue glow color. Other candidates includes zinc sulfide (with green red, and orange formulations). ZnS:Cu, for example, may be obtained from Pete's Luminous Creations of Singapore.

Although the embodiment described herein utilizes spherical objects, it will be apparent to one of skill in the art that any other shape may be used, so long as access is provided to an internal cavity for the application of adhesive and pigments. As additional examples of many, the invention may accordingly be used to provide glow-in-the-dark animal forms, faux rocks, statues, bird baths, planters and so forth.

The invention claimed is:

1. A glow-in-the-dark gazing globe, consisting of:

a hollow, transparent or translucent spherical form having an inner wall; and one or more photoluminescent or phosphorescent pigments adhesively attached to the inner wall of the form in a swirl pattern.

2. The glow-in-the-dark gazing globe of claim 1, wherein the form glass or plastic.

3. A method of fabricating a glow-in-the-dark gazing globe comprising the steps of:

providing a hollow, spherical, transparent or translucent glass form having an interior with an inner wall and an aperture for gaining access to the interior;

applying an adhesive to the inner wall of the form through the aperture; and introducing one more photoluminescent or phosphorescent pigments into the form through the aperture so that they cling to the adhesive on the inner wall and form a swirl pattern.

4. The method of claim 3, wherein a plurality of different pigments are introduced into the form.

5. A gazing globe made in accordance with the method of claim 3.

6. The method of claim 3, including the step of positioning the form with pigments onto a physically separate stand.

* * * * *